Patented Apr. 1, 1947

2,418,326

UNITED STATES PATENT OFFICE 2,418,326

PREPARATION OF ARYLIDES OF AROMATIC ORTHOHYDROXY CARBOXYLIC ACIDS

Robert H. Weiss, Plainfield, and Andrews C. Wintringham, Glen Ridge, N. J., assignors to American Cyanamid Company, New York, N. Y., a corporation of Maine No Drawing. Application April 27, 1945, Serial No. 590,742

5 Claims. (Cl. 260—560)

This invention relates to an improved process for producing arylides of 2-hydroxy-3-naphthoic acid and more particularly to improvements in the isolation of these products from crude reaction mixtures.

Arylides of 2-hydroxy-3-naphthoic acid are usually prepared by reacting the corresponding arylamine with the acid in the presence of a condensing agent such as phosphorus trichloride or thionyl chloride, or reacting the acid chloride of the carboxylic acid with the amine in the presence of an acid binding agent capable of reacting with the hydrochloric acid set free in the reaction.

In either case it is desirable and in fact customary to use diluents such as toluene, monochlorobenzene and the like. An excess of the amine itself may also be used as a diluent, but because of its higher cost it is customary to use cheaper liquids. In every case a reaction mixture is obtained which contains the arylide, unreacted materials, the diluent and other products, some of which are tarry in nature.

Various methods have been used in the past to isolate the arylide from the mixture. Most of the methods involve neutralizing with aqueous alkali and then steam stripping off the organic diluent. Difficulties are involved because tarry impurities are not removed and an arylide of lower purity is obtained; it is difficult to purify and very often recrystallization from an organic solvent is necessary, a separate step which considerably increases the cost. It has also been proposed to filter the neutralized reaction mixture without stripping off the organic diluent. This method has the advantage that a higher purity is obtained because tarry impurities which are soluble in the diluent are removed, but the filtration is difficult because the filter cake packs hard, and it is almost impossible to wash it with aqueous solutions in a reasonable time so as to remove the water soluble impurities.

The present invention is an improvement on the last type of process and produces a high purity product without any of the operating difficulties. According to the present invention, instead of neutralizing with an aqueous alkali, anhydrous alkali metal carbonate or bicarbonate is added to the reaction mixture in amounts that would be sufficient to neutralize the acid content. However, because of the absence of water, no neutralization takes place yet. After the addition of the carbonate filtration is effected under anhydrous conditions at not materially above room temperature, and no difficulty is encountered in this step because no emulsions can form.

Then the filter cake is washed with water and it is only this addition of water that causes neutralization to take place; carbon dioxide is evolved which blows up the filter cake, making it light, fluffy, and porous so that the subsequent washing is easily effected; this is one of the main advantages of the process claimed in the present application.

The present invention is limited to those arylides of 2-hydroxy-3-naphthoic acid which have a low solubility in the inert organic diluents and is also limited by a maximum amount of the diluent to be used. It goes without saying that a considerable solubility or the use of excessive amounts of diluent would otherwise lead to undesirable losses. More specifically, the present invention is limited to those arylides of 2-hydroxy-3-naphthoic acid which have a solubility of not materially more than 1.5 grams per 100 grams of diluent at room temperature and to amounts of this diluent which are not more than 12 times the weight of the hydroxy acid used as starting material. It is also necessary that the filtration step be carried out at a temperature not materially above room temperature since it is obvious that a higher temperature would increase the solubility of the arylide and would cause undesirable losses.

The aromatic amines from which the arylides useful in the process are derived may belong to the benzene series, such as aniline and its homologues, e. g. toluidines and xylidines, and substituted products such as chloro, bromo, alkoxy, aryloxy, nitro, cyano, and sulfonamide derivatives. Amines of condensed nuclei, such as naphthylamines and amines of the biphenyl series are also included, as well as heterocyclic amines such as 2-amino-diphenyleneoxide. However, those arylides that show solubility materially greater than 1.5 grams per 100 grams diluent at room temperature are excluded from the scope of this invention, as stated above.

The present invention is generally applicable to reactions using almost any inert diluent or solvent, that is to say liquids which do not react with the o-hydroxy carboxylic acid, the amine or the arylide. About the only limitation on the solvent or diluent is that it should have adequate solvent action on tarry impurities, and that it shall have low solvent action on the arylide. Aromatic hydrocarbons, such as those of the benzene series, are excellent solvents and the halogenated hydrocarbons, particularly the chlorinated hydrocarbons, are even better suited and many of them are very cheap. Typical diluents are toluenes, xylenes, monochlorobenzene or o-dichlorobenzene. For technical operation monochlorobenzene is particularly good.

Although it is desirable to use diluents which do have low solubility for the arylide, nevertheless some losses will result and some of the dissolved arylide may be recovered by concentrating the solution by evaporation until a further amount of the arylide precipitates out. The concentration should not be carried on to the point where there is insufficient solvent to dissolve tarry impurities.

The invention will be described in greater detail in conjunction with the following specific examples in which the parts are by weight.

*Example 1*

188 parts of 2-hydroxy-3-naphthoic acid, 138 parts of metanitraniline and 1800 parts of monochlorobenzene are heated to 70° C., and 55 parts of phosphorus trichloride added. The mixture is then heated up and refluxed until reaction is complete, followed by cooling to room temperature. 115 parts of dry sodium carbonate powder are then added with stirring, and the mixture is filtered on a suction filter.

The cake is washed with warm water, the sodium carbonate in the cake neutralizing the acidity and giving off carbon dioxide, which fluffs up the cake to a more or less porous mass, which is readily and quickly washed with water and aqueous solutions of alkali, and of acid. An excellent product is obtained.

When the same procedure is followed but no dry sodium carbonate is added before filtration and the filter cake is washed with sodium carbonate, the procedure takes a long time as the cake is very dense and more than twice the time is required for washing to produce a product of the same degree of purity.

*Example 2*

188 parts of 2-hydroxy-3-naphthoic acid, 143 parts of beta-naphthylamine, and 1800 parts of monochlorobenzene are heated to 70° C., and 55 parts of phosphorus trichloride run in. The mixture is then refluxed until the reaction is complete, cooled to room temperature, and 115 parts of dry sodium bicarbonate powder added with stirring. The mixture is then filtered on a suction filter and the cake washed with warm water and with dilute solutions of mild alkali, and of acid. The cake fluffs up promptly as described in Example 1, and an excellent product is obtained with very short washing.

*Example 3*

188 parts of 2-hydroxy-3-naphthoic acid and 1600 parts of monochlorobenzene are mixed together, and 48 parts of phosphorus trichloride added at room temperature with stirring, which is continued for a number of hours until the formation of the 2-hydroxy-3-naphthoyl chloride is complete. Thereupon, 110 parts of ortho-toluidine are slowly added, the mixture slowly heated to the boil, and refluxed until the evolution of hydrogen chloride has practically ceased. The mixture is then cooled to room temperature, and 115 parts of dry powdered sodium bicarbonate added. The mixture is then filtered on a suction filter, and the cake washed with warm water, and then with dilute alkali and acid solutions. The product is the same as that obtained by the procedure of Example 1.

*Example 4*

188 parts of 2-hydroxy-3-naphthoic acid, 143 parts of beta-naphthylamine, and 1800 parts of toluene are heated to 70° C., and 55 parts of phosphorus trichloride run in. The mixture is then refluxed until the reaction is complete, cooled to room temperature, and 115 parts of dry sodium bicarbonate powder added with stirring. The mixture is then filtered on a suction filter and the cake washed with warm water and with dilute solutions of mild alkali, and of acid. The cake fluffs up promptly as described in Example 1, and an excellent product is obtained with very short washing.

This application is in part a continuation of our copending application, Serial No. 488,592, filed May 26, 1943.

We claim:

1. A method for recovering an arylide of 2-hydroxy-3-naphthoic acid from an anhydrous reaction mixture resulting from the reaction of the hydroxy acid with an aromatic amine in the presence of a condensing agent and an inert organic diluent used in an amount of not more than 12 times the weight of the hydroxy acid used, the arylide having a solubility of not materially more than 1.5 grams per 100 grams of the diluent at room temperature, which method comprises dispersing finely divided, dry alkali metal carbonates throughout the mixture in amounts sufficient to react with all of the acid substances present, filtering not materially above room temperature under anhydrous conditions and washing the filter cake with water.

2. A method for recovering an arylide of 2-hydroxy-3-naphthoic acid from an anhydrous reaction mixture resulting from the reaction of the hydroxy acid with an aromatic amine in the presence of a condensing agent and monochlorobenzene used in an amount of not more than 12 times the weight of the hydroxy acid used, the arylide having a solubility of not materially more than 1.5 grams per 100 grams of the diluent at room temperature, which method comprises dispersing finely divided, dry alkali metal carbonates throughout the mixture in amounts sufficient to react with all of the acid substances present, filtering not materially above room temperature under anhydrous conditions and washing the filter cake with water.

3. A method for recovering the m-nitro anilide of 2-hydroxy-3-naphthoic acid from an anhydrous reaction mixture resulting from the reaction of the hydroxy acid with m-nitroaniline in the presence of a condensing agent and of monochlorobenzene used in an amount of not more than 12 times the weight of the hydroxy acid used, which method comprises dispersing finely divided dry alkali metal carbonates throughout the mixture in an amount sufficient to react with all of the acid substances present, filtering not materially above room temperature under anhydrous conditions and washing the filter cake with water.

4. A method for recovering a naphthylamide of 2-hydroxy-3-naphthoic acid from an anhydrous reaction mixture resulting from the reaction of the hydroxy acid with a naphthylamine in the presence of a condensing agent and of monochlorobenzene used in an amount of not more than 12 times the weight of the hydroxy acid used, which method comprises dispersing finely divided dry alkali metal carbonates throughout the mixture in an amount sufficient to react with all of the acid substances present, filtering not materially above room temperature under anhydrous conditions and washing the filter cake with water.

5. A method for recovering the o-toluidide of 2-hydroxy-3-naphthoic acid from an anhydrous reaction mixture resulting from the reaction of the hydroxy acid with o-toluidine in the presence of a condensing agent and of monochlorobenzene used in an amount of not more than 12 times the weight of the hydroxy acid used, which method comprises dispersing finely divided dry alkali metal carbonates throughout the mixture in an amount sufficient to react with all of the acid substances present, filtering not materially above room temperature under anhydrous conditions and washing the filter cake with water.

ROBERT H. WEISS.
ANDREWS C. WINTRINGHAM.

REFERENCES CITED

The following references are of record in the file of this patent:

UNITED STATES PATENTS

| Number | Name | Date |
|---|---|---|
| 1,101,111 | Zitscher | June 23, 1914 |
| 1,890,202 | Tinker | Dec. 6, 1932 |
| 1,908,976 | Grether et al. | May 16, 1933 |

FOREIGN PATENTS

| Number | Country | Date |
|---|---|---|
| 271,146 | British | May 17, 1927 |